(12) United States Patent
Lawton

(10) Patent No.: US 8,003,028 B2
(45) Date of Patent: Aug. 23, 2011

(54) COMPOSITE OF AEROGEL AND PHASE CHANGE MATERIAL

(75) Inventor: Stanley A. Lawton, Clayton, MO (US)

(73) Assignee: The Boeing Company, Chicago, IL (US)

( * ) Notice: Subject to any disclaimer, the term of this patent is extended or adjusted under 35 U.S.C. 154(b) by 1154 days.

(21) Appl. No.: 11/190,031

(22) Filed: Jul. 26, 2005

(65) Prior Publication Data

US 2007/0290392 A1    Dec. 20, 2007

(51) Int. Cl.
B29C 67/00    (2006.01)

(52) U.S. Cl. ......... 264/112; 264/122; 264/108; 264/309

(58) Field of Classification Search .................... 264/86, 264/108, 309

See application file for complete search history.

(56) References Cited

U.S. PATENT DOCUMENTS

| | | | |
|---|---|---|---|
| 3,152,034 A | 10/1964 | Tompkins et al. | |
| 3,285,803 A | 11/1966 | Baldwin et al. | |
| 4,394,337 A | 7/1983 | Kummermehr | |
| 4,399,175 A | 8/1983 | Kummermehr et al. | |
| 5,877,100 A | 3/1999 | Smith et al. | |
| 6,183,855 B1 | 2/2001 | Buckley | |
| 6,270,836 B1 * | 8/2001 | Holman | 427/126.3 |
| 6,478,864 B1 * | 11/2002 | Field | 106/169.17 |
| 6,770,584 B2 | 8/2004 | Barney et al. | |
| 7,144,522 B2 * | 12/2006 | Burchill et al. | 252/62 |
| 2001/0034375 A1 * | 10/2001 | Schwertfeger et al. | 516/98 |
| 2002/0164474 A1 | 11/2002 | Buckley | |
| 2002/0164476 A1 * | 11/2002 | Kahl et al. | 428/328 |
| 2003/0041981 A1 | 3/2003 | Cramer, III | |
| 2003/0215640 A1 * | 11/2003 | Ackerman et al. | 428/405 |
| 2004/0077738 A1 * | 4/2004 | Field et al. | 521/50 |
| 2005/0025952 A1 * | 2/2005 | Field et al. | 428/304.4 |
| 2005/0047871 A1 | 3/2005 | Lee et al. | |

FOREIGN PATENT DOCUMENTS

| | | |
|---|---|---|
| DE | 201 01 177 | 4/2001 |
| WO | WO 96/15998 | 5/1996 |
| WO | WO 97/10187 | 3/1997 |
| WO | WO 2004/033567 | 4/2004 |
| WO | WO 2006/074463 | 7/2006 |

OTHER PUBLICATIONS

International Search Report and Written Opinion mailed Feb. 28, 2007 in International Application No. PCT/US2006/029095.

* cited by examiner

*Primary Examiner* — Khanh Nguyen
*Assistant Examiner* — Margaret Squalls
(74) *Attorney, Agent, or Firm* — Harness, Dickey & Pierce, P.L.C.

(57) ABSTRACT

A method of forming a thermally insulating body that may involve co-depositing onto a substrate, particles containing aerogel material, particles containing phase change material, and a solution containing a binder and a carrier. The phase change material may have encapsulated phase change material particles in which a phase change substance encapsulated within durable capsules transitions from a solid to a liquid at a temperature greater than about 100 degrees Fahrenheit. The carrier may be removed after the co-deposition to form a solid thermally insulating body on the substrate.

2 Claims, 3 Drawing Sheets

COMPOSITE OF AEROGEL AND PHASE CHANGE MATERIAL

FIELD OF THE INVENTION

This invention pertains to aerogels and to thermal insulation composites containing aerogel.

BACKGROUND OF THE INVENTION

Aerogels are known to provide good thermal insulation properties and have attractive thermal protection per unit weight as compared to other materials. Materials with high thermal insulation such as aerogels are required for ever-increasing speed utilized in vehicles, particularly aircraft. This is particularly the case where vehicles experience severe heat loads for extended periods of time. Unfortunately, aerogels are difficult to apply to surfaces that require protection. Aerogels are available in solid or, more usually, flexible blanket forms and are not conventionally sprayed. Neither the solid or blanket form is as readily applied to a surface as a sprayed material. Aerogels can be applied by a spray application process wherein aerogel-binder compositions are used for application of the aerogel, where the binder holds the aerogel particles together and to the surface to which it is applied. However, the binder material has less attractive thermal performance as compared to the aerogel; consequently, substitution of a portion of the aerogel for the binder presents a disadvantage. Accordingly, there is a need for improvement to thermal protection systems which are based on aerogel insulating materials.

SUMMARY OF THE INVENTION

In one aspect, the invention provides a body comprising particles of an insulating aerogel material intermingled with particles containing a phase change material, and a binder forming a matrix retaining the intermingled particles.

In another aspect, the invention provides a method of forming an insulating body by applying first and second streams onto a substrate. The first stream contains a binder and the second stream contains particles of an aerogel material; and simultaneously applying a phase change material (PCM) onto the substrate. Optionally, the PCM is included in the first stream, the second stream, a third stream, or any combination thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
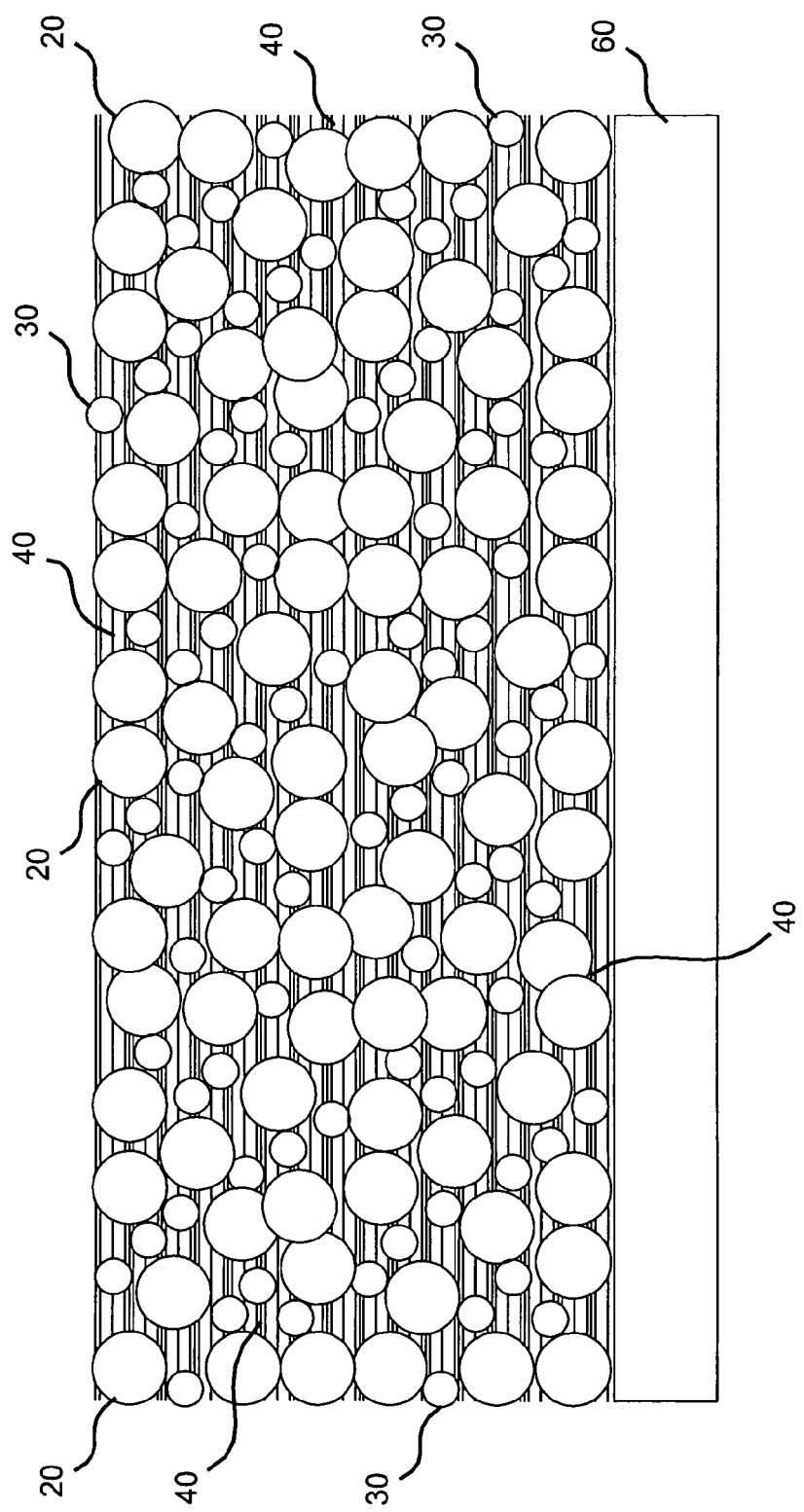
FIG. 1 is a schematic of the aerogel/PCM coating.

The following description of the preferred embodiment(s) is merely exemplary in nature and is in no way intended to limit the invention, its application, or uses.

In one aspect, the invention provides a body of material which comprises an insulating aerogel material intermingled with a phase change material (PCM). The phase change material is capable of storing thermal energy as latent heat of phase change. Preferably, the aerogel material and the phase change material are retained in a binder matrix.

In another aspect, the invention provides a method of forming a thermally insulating body by co-depositing onto a substrate particles comprising aerogel, particles comprising phase change material, and a solution containing a binder and a carrier. The carrier is removed to form a solid thermally insulating body on the substrate.

In a still further aspect, the invention provides a method for forming an insulating body by simultaneously discharging first and second streams onto a substrate. The first stream comprises aerogel containing particles and the second stream comprises a binder. By separately depositing the aerogel and the binder, it is possible to prevent degradation and friability of the delicate aerogel particles during the deposition. In other words, problems associated with the difficulty of mixing aerogel particles into a suitable binder are avoided by the deposition process of the invention.

Any suitable hydrophobic aerogel particles are preferred for use in the invention. Hydrophobic aerogel particles include organic aerogel particles and inorganic aerogel particles. Inorganic aerogel particles are preferred for use in the invention, such as metal oxide aerogel particles, for example, silica, titania and alumina aerogels. It is most preferred to use silica-based aerogel particles. Hydrophilic aerogel particles are also known. The invention is exemplified with the use of the preferred hydrophobic aerogel particles.

Preferably, the hydrophobic aerogel particles comprise opacifying agents which reduce the thermal conductivity of the hydrophobic aerogel particles. Any suitable opacifying agent is usable including, but not limited to, carbon black, carbonaceous material, titania, or other small particle, adherent, opacifying agent.

The size of the hydrophobic aerogel particles used will depend, in part, on the desired features of the final article or body of insulating material. The particle size of the aerogel particles will also depend, at least in part, on the particle size of the associated PCM material. The selection of particle size will also be in part dependent on the type of binder selected. In order for the particles of the PCM material and the aerogel materials to be intermingled, the size of the associated particles are selected to conveniently achieve this.

Exemplary particle sizes for the hydrophobic aerogel particles are on the order of 6 micrometers to three millimeters. Exemplary particle size for the phase change material is on the order of fifteen to forty micrometers. Suitable opacifying agents includes those which will minimize the travel of infrared ("IR") radiation through the composition.

Depending on the application, the size and distribution of spaces between the particles may be enlarged or reduced by utilizing selected particle sizes for both the PCM material and the aerogel. The exemplary schematic FIG. 1 shows a case where the aerogel particles 20 are of a size greater than the phase change particles 30. However, the reverse arrangement may be selected. It is also possible to select an arrangement where the PCM materials and the aerogel particles have an average particle size that approaches one another. As used herein, the term particle size and particle diameter are used synonymously, as is typical in the art.

Hydrophobic aerogel particles of a diameter from six micrometers to three millimeters and available with titanium dioxide opacification to infrared radiation are available as a nanogel under the trademark NANOGEL™ beads manufactured by Cabot Nanogel GmbH Germany.

Phase Change Materials are available from a variety of sources including THERMASORB™ obtainable from Outlast Technologies, Inc. of Boulder, Colo. THERMASORB PCM materials appear as fine, free-flowing powders and consist of durable capsules which contain heat-absorbing core materials. The capsules are available in a variety of sizes from 1 to several hundred micrometers in diameter. Typically, the core PCM material comprises 80% to 85% of the weight with the impermeable shell constituting the balance. The shell is of a durable material that withstands exposure to a variety of solvents and therefore are deliverable as either dry powder form or within aqueous organic or other solvent slurries. The PCM material exemplified by THERMASORB is available in a variety of transition temperatures ranging from about −20 degrees Fahrenheit to over 100 or over 200 degrees Fahrenheit.

In general, phase change materials have the ability to absorb large amounts of heat, without changing temperature, as they transition from a solid to a liquid in the typical case. They then release the corresponding heat as they change back from a liquid to a solid form. Thus, the PCM material provides the ability to maintain an essentially constant temperature as heat is absorbed or given off from a body of material within which the PCM is contained.

A preferred PCM material comprises waxes or closely related petroleum products which transition from solid to liquid form in the desired temperature range. Blends of such products are selected in order to achieve the desired transition. For purposes of exemplifying the present invention, a THERMASORB brand phase change material was selected having a transition from solid to liquid at 122 degrees Fahrenheit with a latent heat of 160 J/g. Encapsulated diameters range from 5 to 40 micrometers.

Although the invention is exemplified with reference to a PCM material which transitions from a solid to liquid phase, it is also contemplated to use the advantage of phase change from solid to solid where a phase condition associated with the structure of the solid changes to a second structural condition having a different solid phase and a different energy level, thus making use of the latent heat of a solid to solid phase change. Although other phase change phenomena are contemplated by the invention such as gas liquid and gas solid, they are less desirable for practical reasons.

It is evident that the thermal characteristics of the insulating body can be tailored by the choice of the PCM, aerogel and the binder used to form a matrix to contain the PCM and the aerogel. Thus, the choice of the PCM depends on the intended application, the overall composite and the desired characteristics. The PCM is preferably encapsulated in microcapsules or larger capsules or a mixture of sizes as desired. Such encapsulation prevents the PCM from migrating when it is in a liquid state. This also prevents the PCM from forming one solid inflexible mass as it re-cools. In the preferred embodiment, it is preferred that the PCM be encapsulated. The invention also encompasses the dispersion of particles of PCM material in the binder matrix material as well. Thus, the binder matrix material itself can also serve an encapsulate function.

One example of a suitable PCM material is wax, particularly petroleum/paraffin wax, which can melt and resolidify as the temperature increases and decreases. For example, such wax compositions have a transition range suitable for the high temperature environment for vehicles, including aircrafts, mainly in a range of greater than about 100 degrees Fahrenheit to the order of about 200 degrees Fahrenheit, where many waxes have their typical melting points. By manipulating the wax composition, the PCM can be tailored to have a varied melting point depending on the desired operating temperature condition.

The matrix binder material 40 of the invention is selected to form a suitable matrix for retaining the PCM 30 and the aerogel 20 (FIG. 1). It is required to have the strength and thermal conductivity characteristics suitable for this function and have a service temperature in a suitable range, which corresponds to the temperature ranges as recited earlier with respect to the aerogel and the PCM material. One exemplary binder is sold under the designation SYLGARD™ 184 silicone elastomer by Dow Corning of Michigan. Dow Corning's silicones are provided in a two-part silicone elastomer composition as a flow of the liquid which cures to a flexible elastomer at a relatively constant cure rate and has a service range of −49 to 392 degrees Fahrenheit. The binder silicone precursor mixture is applied and cured to remove any carrier solvent. Another exemplary silicone compound is sold under the designation RTV Silicones™ by MG Chemicals of Surrey, British Columbia, Canada. Such silicones have a thermal conductivity of about 0.17 W/m×degrees K. The RTV and SYLGARD™ silicone elastomer binder are both types of silicone-based elastomers, but they cure by different processes (addition or condensation reactions).

It is known that there are various types of aerogel particles such as silica and carbon. Silica aerogel particles are preferred. The encapsulate of the PCM material is selected so that it does not dissolve in the matrix material such as the silicone elastomeric material.

The ratio of the three ingredients is adjustable to provide the desired temporal thermal properties of the composite body. It is evident that any amount of PCM material added to the aerogel composition in the binder matrix will have an effect on thermal transient performance. Thus, the PCM material and the aerogel material together on the basis of 100 parts by weight, the PCM material is present in an amount greater than 0 and less than 100 parts; desirably up to 90 parts; more desirably up to 80 parts; and most desirably at least about 60 parts. Depending on the selection of PCM material, and the environment of operation, on the basis of 100 parts by weight combined of aerogel and PCM material, the aerogel is present in an amount greater than 0 parts and less than about 100 parts; desirably up to 40 parts; more desirably up to 20 parts; and most desirably at least about 10 parts.

In a still further aspect, on the basis of volume percent of aerogel in the combined composite, the aerogel constitutes at least 50% by volume, desirably 60% by volume; more desirably 70% or more by volume. Preferably, the aerogel is present in an amount of at least 50% by volume of the finished product.

The present invention provides a method by which it is possible to apply the aerogel 20 along with the matrix material 40 in a manner that does not break up the friable aerogel material into fine powder form. It also avoids the problem that the silicone elastomeric binder 40 and aerogel 20 tend to not mix and if the binder precursor solution 50 is too thick, the aerogel becomes friable, and if the precursor solution is rendered more flowable by the inclusion of a solvent, the aerogel has a tendency to absorb or take up the solvent, which is undesirable. Thus, the method of the invention utilizes the process whereby a stream of 22 aerogel particles 20 are disbursed and directed to the surface of the substrate 60 while at the same time a stream 52 or mist of silicone precursor solution 50 is also applied; whereby the droplets of the silicone binder precursor intermingle with the aerogel upon application so that particles of aerogel become attached and retained within the matrix binder.

In the preferred process of the invention, particles of the PCM material 30 are co-deposited with the aerogel and the silicone precursor to form the composition of the invention. A separate stream of the PCM material 30 may be used. However, it is preferred to combine the particles of aerogel 20 and PCM 30 in one stream 22. Depending on the precursor binder solution, after deposition, a period of cure is implemented so that the carrier of the solution is removed to form the solid body. Drying or baking optionally may be implemented in order to facilitate removal of the carrier solvent of the solution.

EXAMPLE

Figure 2:
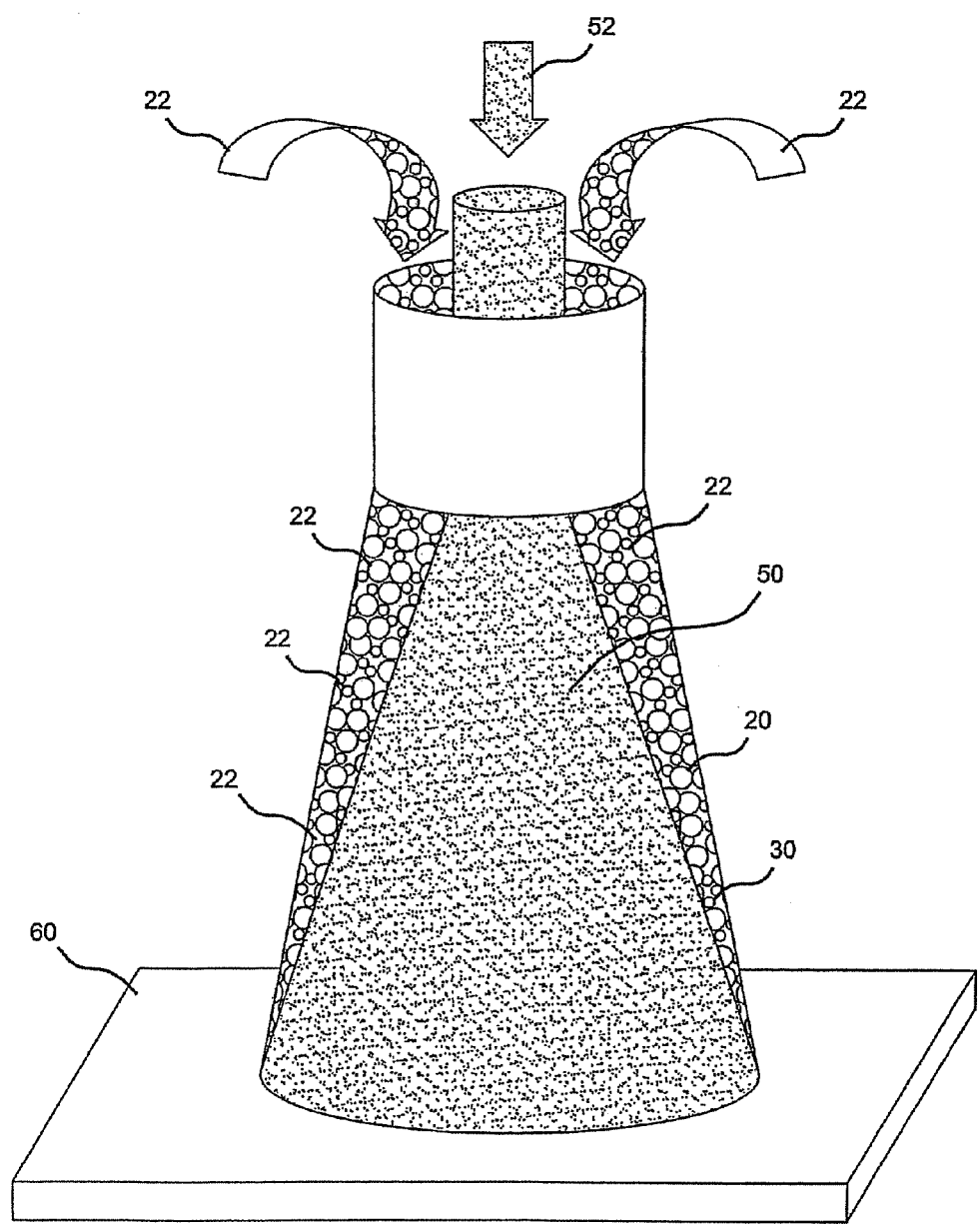
FIG. 2 is an illustration of a deposition apparatus.

Deposition of the silicone matrix binder 40, aerogel 20 and PCM 30 material were accomplished by an apparatus as schematically shown in FIG. 2 for application onto a substrate. The preferred process was a convergent spray process. By the convergent spray process, aerogel particles 20 become mixed with the liquid silicone precursor 50 immediately prior to or at deposition on the substrate 60.

PCM beads are also included and they may be included in either the silicone mixture 50 or along with the aerogel 20 or separately. Thus, two or more deposition streams may be utilized. The method of deposition minimizes breakup of the friable aerogel particles and minimizes absorption of a solvent by the particles. Any conventional spraying apparatus may be utilized to achieve the formation of the deposition streams. Preferred deposition rates are shown in Table 1 along with exemplary compositions of the deposition material.

Figure 3:
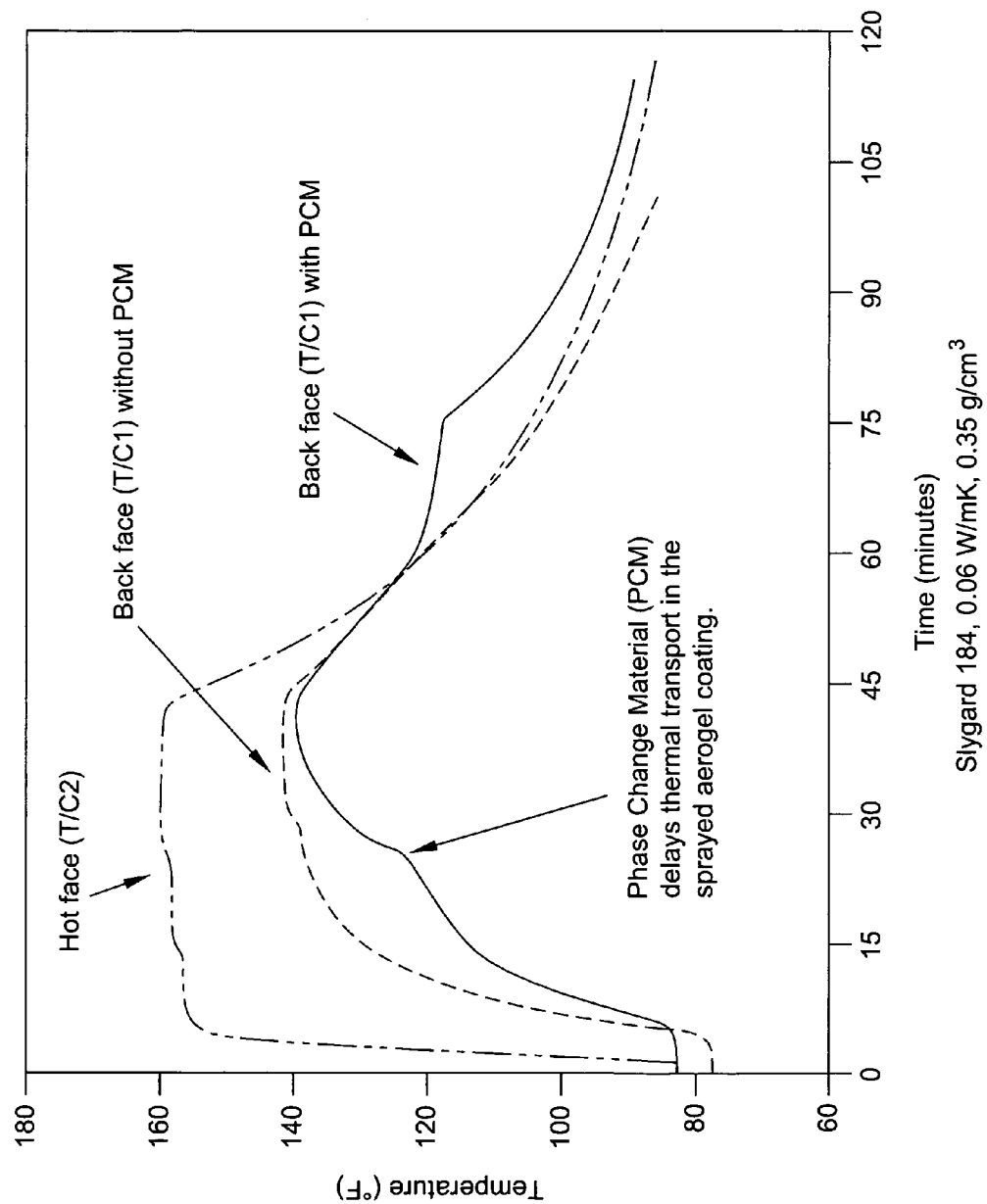
FIG. 3 is a graph showing PCM improves transient thermal performance.

Table 1 also includes the results of the thermal analysis showing the thermal conductivity of the applied material and corresponding mean temperature. It can be seen that the inclusion of PCM material along with the aerogel does not significantly affect the thermal conductivity. Thus, the addition of the PCM material provides the advantage of improved performance during thermal transience. It was observed that as the proportion of aerogel in the composition increases, the deposited product becomes more fragile. As the proportion of binder is increased, strength improves but conductivity is less advantageous. As the proportion of PCM material increases, there is better capability to handle thermal transience, but with a small loss of the benefit of low thermal conductivity of the aerogel materials. Although there is a small degradation in thermal conductivity performance with the substitution of PCM material for aerogel, it is advantageous that with the PCM, it takes longer for the material to reach a higher temperature as shown in FIG. 3. FIG. 3 shows thermal transient response to a sprayed aerogel composition, one which contains the PCM material and one which does not contain PCM material. It can be seen that it takes longer for the PCM-containing material to reach a higher temperature and actually does not reach as high a temperature as the aerogel composition without the PCM. There is an evident knee in the curve of the composition that contains the PCM at 122 degrees Fahrenheit evidencing the phase change and showing the rate of temperature increase of this composition as less.

Table 1 provides the rates at which various panels were made. For the Sylgard 184, there was added 10% by weight Dow Corning OS-10 methylsiloxane solvent to allow the liquid to flow easily through the lines. The liquid Sylgard/OS-10 rate varied from 18 to 50 grams/minute; the Nanogel varied from 12 to 27 grams per minute; and the Thermosorb from 3 to 43 grams/minute. For the RTV-12, the rates used were 23 and 28 grams/minute of RTV, 12-18 grams per minute of Thermosorb and 12-18 grams/minute of nanogel. Various combinations worked well, but the 184-1, 2, 3, 4 and RTV-1, 2, 3, 4 were the better combinations of materials. The Cabot nanogel is hydrophobic silica aerogel. The material size indicated in the example worked well. Uniform 1 mm diameter particles did not stick to the panels.

In summary, the present invention provides the advantage of use of a phase change material with aerogel in order to provide capability of absorbing heat while holding a constant temperature, thus effectively improving the thermal performance of the insulating body. The PCMs are used to at least temporarily maintain a maximum temperature. Therefore, adding the PCM to the aerogel composite provides the advantage of the transient thermal performance of the aerogel along with the heat absorbing capability of the PCM, thereby providing better thermal protection than with the aerogel material alone. Preliminary tests as shown herein have demonstrated good thermal performance coupled with a delay in the heat transport through the coating. The results as contained herein show advantageous thermal conductivity and delay of transient heat transfer of the composites of the invention. The aerogels provide the advantage of low steady state thermal conductivity. The binder matrix retains the particles of materials and the PCM material provides delay of the transient heat transfer effects.

TABLE 1

|  | Sylgard 184 or RTV 12 Binder | Liquid Rate (g/min.) | Solvent (%) | Nano-gel Rate (g/min.) | Therma-sorb (g/min.) | Product Density (g/cm³) | Vol. % Aerogel | Thermal Conductivity (w/mk) |
|---|---|---|---|---|---|---|---|---|
| 184-1 | 184 | 23.9 | 10 | 11.9 | 0 | 0.32 | 76.8 | 0.06 (98° F.) 0.08 (398° F.) |
| 184-2 | 184 | 23.9 | 10 | 18.2 | 0 | 0.24 | 85.3 | 0.05 (99° F.) 0.06 (198° F.) |
| 184-3 | 184 | 23.9 | 10 | 11.9 | 42.5 | 0.42 | — | 0.08 (99° F.) 0.09 (399° F.) |
| 184-4 | 184 | 23.9 | 10 | 11.9 | 21.7 | 0.35 | — | 0.07 (100° F.) 0.07 (199° F.) |
| RTV-1 | RTV-12 | 23.3 | 0 | 12.3 | 0 | 0.30 | 78.49 | 0.06 (100° F.) 0.08 (397° F.) |
| RTV-2 | RTV-12 | 23.3 | 0 | 18.6 | 0 | 0.27 | 81.86 | 0.05 (100° F.) 0.08 (398° F.) |
| RTV-3 | RTV-12 | 23.3 | 0 | 12.3 | 43.2 | 0.50 | — | 0.09 (99° F.) |
| RTV-4 | RTV-12 | 23.3 | 0 | 12.3 | 22.7 | 0.54 | — | 0.09 (99° F.) 0.09 (201° F.) |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of forming an insulating body comprising:
    applying first and second streams onto a substrate while simultaneously applying a phase change material (PCM) onto the substrate, the PCM being applied in a third stream;
    the first stream comprising a binder and the second stream comprising particles containing aerogel material;
    the PCM comprising encapsulated phase change material contained within capsules having a diameter of between about 5 micrometers to about 40 micrometers, with the encapsulated phase change material being contained within durable capsules and able to transition from a solid to a liquid at a temperature greater than about 100 degrees Fahrenheit, to thus enhance thermal transience performance of the insulating body; and
    the PCM comprising at least about 60 parts out of 100 parts by weight of the total combined weight of the binder and the aerogel material.

2. The method of claim 1, wherein the PCM is contained in particles that are included in the second stream.

* * * * *